(12) United States Patent
Nakao (10) Patent No.: US 8,595,351 B2
(45) Date of Patent: Nov. 26, 2013

(54) MONITORING SYSTEM (75) Inventor: Toshiaki Nakao, Hirakata (JP)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 12/922,735

(22) PCT Filed: Mar. 31, 2009

(86) PCT No.: PCT/JP2009/056689
§ 371 (c)(1),
(2), (4) Date: Sep. 15, 2010

(87) PCT Pub. No.: WO2009/123202
PCT Pub. Date: Oct. 8, 2009

(65) Prior Publication Data
US 2011/0016211 A1 Jan. 20, 2011

(30) Foreign Application Priority Data
Mar. 31, 2008 (JP) ................. 2008-093880

(51) Int. Cl.
G06F 15/173 (2006.01)

(52) U.S. Cl.
USPC ........................................ 709/224; 709/238

(58) Field of Classification Search
USPC ................................. 709/224, 238
See application file for complete search history.

(56) References Cited

U.S. PATENT DOCUMENTS

| 5,920,701 | A  | * | 7/1999 | Miller et al. | 709/228 |
| 6,799,270 | B1 | * | 9/2004 | Bull et al. | 713/153 |
| 7,747,741 | B2 | * | 6/2010 | Basani et al. | 709/224 |
| 2009/0182842 | A1 | * | 7/2009 | Dutta et al. | 709/218 |

FOREIGN PATENT DOCUMENTS

| JP | 2006-54832 | * | 2/2006 | ............... H04Q 9/00 |
| JP | 2006-54832 A | | 2/2006 | |

OTHER PUBLICATIONS

Pallos, R.; Farkas, J.; Moldovan, I.; Lukovszki, C., "Performance of rapid spanning tree protocol in access and metro networks," Access Networks & Workshops, 2007. AccessNets '07. Second International Conference on , vol., no., pp. 1,8, Aug. 22-24, 2007.*
Chiussi, F.M.; Khotimsky, D.A.; Krishnan, S., "A network architecture for MPLS-based micro-mobility," Wireless Communications and Networking Conference, 2002. WCNC2002. 2002 IEEE , vol. 2, no., pp. 549,555 vol. 2, Mar 2002.*
International Search Report for the Application No. PCT/JP2009/056659 mailed May 19, 2009.

* cited by examiner

Primary Examiner — Jeffrey R Swearingen
Assistant Examiner — Taylor Elfervig
(74) Attorney, Agent, or Firm — Renner, Otto, Boisselle & Sklar, LLP (57) ABSTRACT A monitoring system includes a center device and terminal devices. The center device is configured to return a first response if receiving a first request from a terminal device. At this point, if the center device has a second request to at least one of the other terminal devices, the center device includes the second request and identification information of a corresponding terminal device in the first response. If receiving the first response, the terminal device transfers the second request to the corresponding terminal device.

14 Claims, 5 Drawing Sheets

MONITORING SYSTEM

TECHNICAL FIELD

The invention relates generally to monitoring systems and, more particularly, to a monitoring system comprising terminal devices and a center device which are configured to communicate with each other, wherein the terminal devices are also configured to communicate with each other.

BACKGROUND ART

For Example, Japanese Patent Application Publication No. 2006-054832 published on Feb. 23, 2006 discloses a remote supervisory control system. The system includes terminal devices and a center device which are configured to communicate with each other. Each of the terminal devices is connected with at least one monitored device. Each monitored device is monitored or controlled based on information such as monitor, control or the like which is transmitted between the center device and each terminal device.

In another monitoring system including a center device and terminal devices, for example, the center device transmits a request to each terminal device by polling. Each terminal device returns a response to the center device. Thereby, the center device obtains information from each of the terminal devices, and also transmits information (e.g., control information) to each terminal device. However, in the configuration that each terminal device communicates with the center device through a router, the center device cannot transmit a request to each terminal device by polling.

In the aforementioned remote supervisory control system, the center device cannot transmit a request to any terminal device in the destination through a destination router. However, each terminal device transmits a request to the center device, and thereby the center device can transmit a response to the originating terminal device through the destination router.

In any configuration of them, a request is transmitted to each destination at constant intervals in general. For example, when monitor information is transmitted from each terminal device to the center device, the center device returns control information to each terminal device at constant intervals.

However, in these communication systems, even if a center device has information to be transmitted to a specific terminal device, it cannot transmit the information to the specific terminal device until obtaining a request from the specific terminal device. That is, delay occurs.

If the constant interval is shortened, delay time can be shortened. However, when the number of the terminal devices is increased, the constant interval is more shortened. Accordingly, it is necessary to raise the communication speed between the center device and each terminal device. In addition, the processing load of the center device is increased.

DISCLOSURE OF THE INVENTION

It is an object of the present invention to shorten transmission (return) delay of information to be transmitted from a center device to a specific terminal device without increase of the processing ability of the center device and a communication speed.

A monitoring system of the present invention comprises a center device and a plurality of terminal devices. The center device comprises a center response function and a center request function. The center response function is configured to return a first response including prescribed information in response to a first request, based on a time schedule, from each of the terminal devices, and thereby to transmit the prescribed information to the terminal device. The center request function is configured, if having at least one second request to be transmitted to at least one of other terminal devices when receiving said first request, to include the at least one second request in the first request. Each of the terminal devices comprises a terminal transfer function configured, if the first response corresponding to the first request includes the at least one second request, to transfer the at least one second request to said at least one of other terminal devices.

Preferably, the center device and the terminal devices may each comprise their own first communication devices. Each of the first communication devices may be configured to provide communication between the center device and each of the terminal devices as well as between the terminal devices. The center response function may be configured, if receiving a first request from any one of the terminal devices through the first communication device of the center device, to return a first response through the first communication device. The center request function may be configured, if having at least one second request to be transmitted to at least one of other terminal devices before the center response function returns the first response, to include the at least one second request and identification data of the at least one terminal device in the first response. Each of the terminal devices may comprise a controller that comprises a terminal request function and said terminal transfer function. Said terminal request function may be configured to transmit a first request to the center device through the first communication device of its own terminal device. Said terminal transfer function may be configured, if the first response corresponding to the first request includes at least one second request and identification data of at least one terminal device, to transfer the at least one second request to the terminal device specified by the identification data of at least one terminal device through said first communication device.

In the present invention, if a first response from the center device includes at least one second request and so on, the terminal device receiving the first response transfers the second request to a corresponding another terminal device. Accordingly, it is possible to shorten transmission (return) delay of information to be transmitted from the center device to a specific terminal device without increase of the processing ability of the center device and a communication speed.

In an embodiment, each of the terminal devices is configured to communicate with at least one monitored device. Each controller of the terminal devices is configured, in accordance with a first response from the center device or a second request from another terminal device, to execute processing corresponding to the first response or the second request. Each of the terminal request functions is configured to transmit a first request to the center device through the first communication device of its own terminal device in accordance with the schedule set based on the terminal devices. In this embodiment, the center device can control or monitor at least one monitored device under each terminal device.

In an embodiment, the terminal devices are divided into a plurality of groups configured to communicate with the center device through a plurality of routers, respectively. The center request function is configured, if the center device has at least one second request to be transmitted to at least one of other terminal devices under the same router as the destination of said first response before returning the first response, include the at least one second request and identification data of the at least one terminal device in the first response. In this embodiment, the second request is simply transferred from the terminal device receiving the second request to another terminal device under the same router. Accordingly, the second request can be transferred promptly. The second request is also transferred in a local area, and therefore communication confidentiality can be enhanced, and the traffic in a wide area network can be prevented from increasing.

In an embodiment, identification data of each of the terminal devices is local identification data. Each of the terminal devices further comprises a storage device for storing local identification data of each of other terminal devices under the same router as its own one. In this embodiment, each terminal device can specify the destination of the second request from the center device based on a local identification data set stored in the storage device, and then transfer the second request.

In an embodiment, identification data of each of the terminal devices is address information. In this embodiment, each terminal device can immediately transfer the second request from the center device to a corresponding another terminal device by the address information.

In an embodiment, each controller of the terminal devices further comprises a terminal response function configured, in accordance with a second request from another terminal device, to execute the processing corresponding to the second request; and subsequently to return a response representing completion of the processing to the center device through the first communication device of its own terminal device. In this embodiment, the center device can confirm the receipt of the second request, and also confirm the completion of the processing corresponding to the second request.

In an embodiment, each schedule of the terminal devices is set so that each of the terminal devices can communicate with the center device at constant intervals.

In an embodiment, each schedule of the terminal devices is set so that a terminal device can communicate with the center device at shorter intervals as the terminal device has a higher communication ratio with the center device. In this embodiment, an occurrence frequency of second responses can be reduced. Each of the terminal devices can exclusively operate in accordance with a first response corresponding to its own first request. As a result, response can be enhanced, and processing load can be prevented from increasing.

In an embodiment, the center device further comprises a history storage device for storing a transmission history of first responses to the terminal devices and second requests by terminal device. Said communication ratio is a transmission ratio of first responses from the center device to each of the terminal devices and second requests, and is obtained from the transmission history. In an embodiment, the transmission (time) interval of first requests can be made proper.

In an embodiment, the controller of the center device further comprises a schedule setting function configured: (i) to evaluate the number of the terminal devices based on communication with each of the terminal devices; (ii) to determine each schedule of the terminal devices in response to to the processing ability of the controller and the number of the terminal devices; and (iii) to transmit a corresponding schedule to each of the terminal devices through the first communication device. Each controller of the terminal devices further comprises an updating function for updating its own schedule to the schedule from the center device. In this embodiment, even if the number of the terminal devices is increased, the processing load of the center device can be prevented from exceeding the processing ability of the center device. It is also possible to prevent the transmission interval of the first request from being extremely lengthened.

In an embodiment, the controller of the center device further comprises a load computational function configured to estimate or calculate processing load of the controller. The schedule setting function is configured, if obtaining a larger processing load from the load computational function, to determine each schedule of the terminal devices so that each of the terminal devices can communicate with the center device at longer intervals. In this embodiment, the processing load of the center device can be prevented from increasing.

In an embodiment, each controller of the terminal devices further comprises a rate computational function configured to estimate or calculate a communication ratio with the center device caused by at least one monitored device connected to its own terminal device. The schedule setting function is configured, based on each communication rate obtained from the rate computational functions of the terminal devices, to determine each schedule of the terminal devices so that a terminal device can communicate with the center device at shorter intervals as the terminal device has a higher communication rate. In this embodiment, the occurrence frequency of second responses can be reduced, and each of the terminal devices can exclusively operated in accordance with a first response corresponding to its own first request. Consequently, the response can be enhanced, and the processing load can be prevented from increasing.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1A:
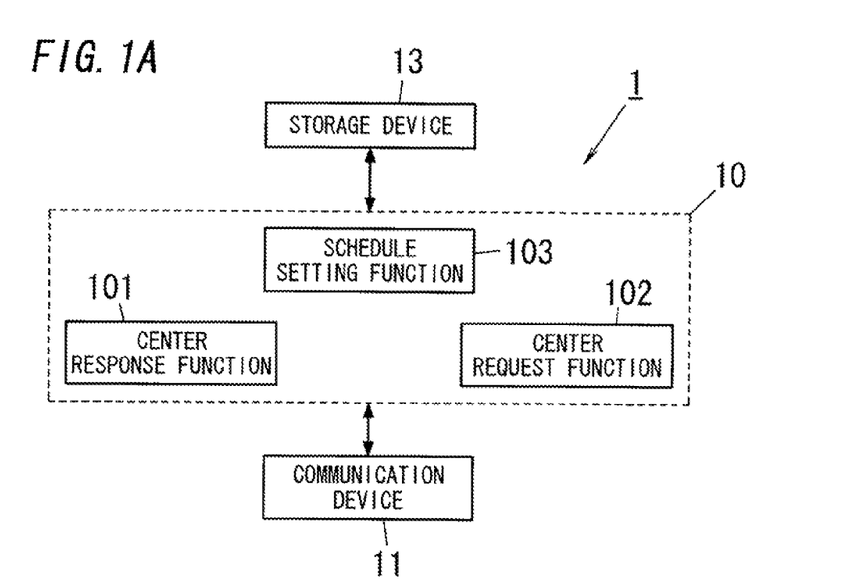
FIGS. 1A and 1B show block diagrams of a center device and a terminal device in a monitoring system in accordance with an embodiment of the present invention, respectively.
Figure 1B:
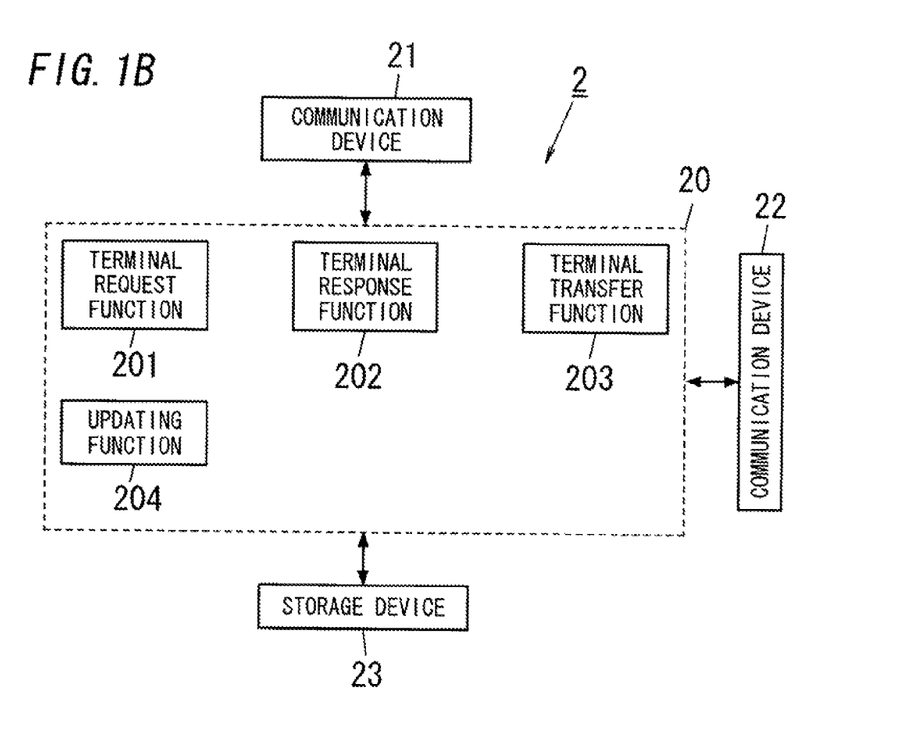
Figure 2:
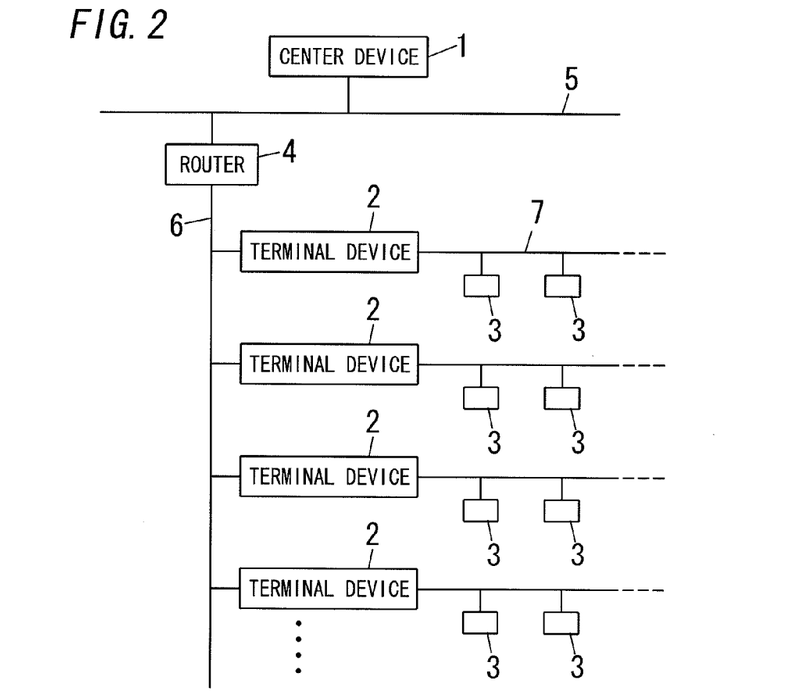
FIG. 2 is a schematic diagram of the monitoring system.

FIGS. 1A and 1B show a center device and a terminal device in a monitoring system in accordance with an embodiment of the present invention, respectively. As shown in FIGS. 1A, 1B and 2, the monitoring system is, for example, a server-client system including a center device 1 (a server) and terminal devices 2 (clients). The terminal devices 2 are divided into groups which can communicate with the center device 1 through routers 4, respectively. FIG. 2 shows terminal devices 2 and a router 4 in one group. The router 4 is connected with the center device 1 via a communication line 5 (e.g., a wide area network such as an internet), while the terminal devices 2 are mutually connected through another communication line 6 (e.g., a local network). However, not limited to this, the communication line 5 may be also a local network. In this instance, the router is not indispensable.

In addition, each terminal device 2 is to be connected with at least one monitored device 3 through a communication line 7. In the example of FIG. 2, each terminal device 2 is connected with monitored devices 3 through the communication line 7 (e.g., a two wired signal line). Each monitored device 3 is, for example, a device such as a light fixture, a measurement hardware or the like, and has identification data. For example, a terminal device 2 transmits a control signal including identification data of a light fixture (a monitored device 3), and thereby can turn the light fixture on or off. In addition, a terminal device 2 transmits a signal including identification data of a measurement hardware, and thereby can obtain monitored information from the measurement hardware.

As shown in FIG. 1A, the center device 1 is, for example, a computer including a communication device 11 (a first communication device), a storage device 13 and a controller 10, and is connected with the communication line 5 through a router (not shown). The center device 1 also includes a timer (not shown). The communication device 11 is, for example, a network interface compliant to IEEE 802.3 or the like. The storage device 13 is, for example, a semiconductor memory device, a hard disk drive or the like.

The controller 10 is formed of one or more CPUs, programs and so on, and has a center response function (or means) 101, a center request function 102 and a schedule setting function 103.

Figure 3:
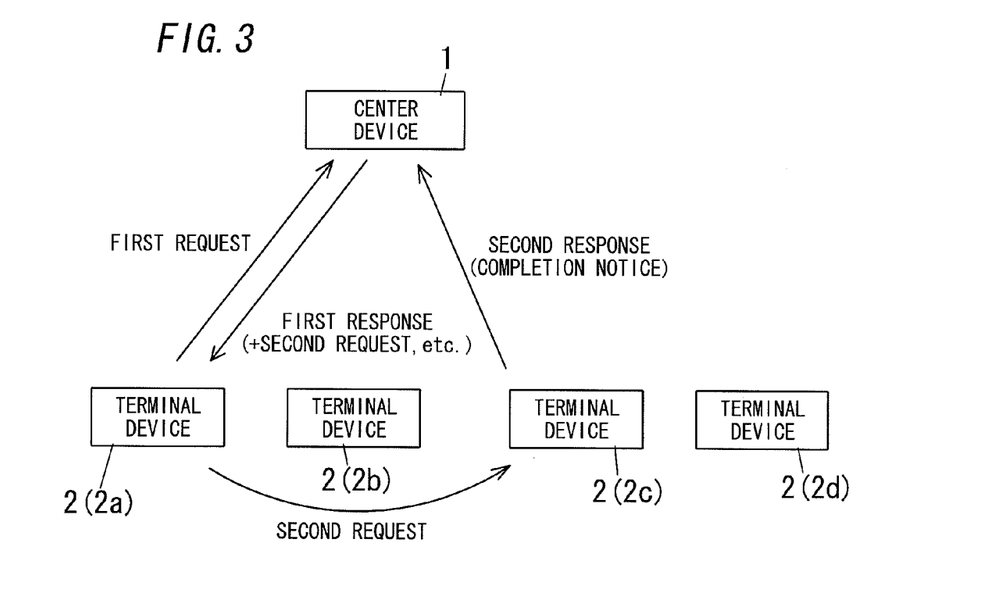
FIG. 3 is an explanatory diagram of operation of the monitoring system.

The center response function 101 is configured, if receiving a first request from any one of the terminal devices 2 through the communication device 11, to return a first response to the terminal device 2 through the communication device 11 (see FIG. 3). In this instance, if having a request to the destination, the center device 1 includes the request to the destination in the first response.

The center request function 102 is configured, if having at least one second request to be transmitted to at least one of the other terminal devices 2 before the center response function 101 returns the first response, to include, in the first response, the at least one second request and identification data of the at least one terminal device 2 (see FIG. 3). In the embodiment, the terminal devices 2 are divided into groups through routers 4, respectively. Accordingly, the function 102 is configured, if the center device 1 has at least one second request to be transmitted to at least one of other terminal devices 2 under the same router 4 as the destination of the first response before return of the first response, include the at least one second request and identification data of the at least one terminal device 2 in the first response. For example, a request to the destination included in a first response or a second request is generated at constant intervals or generated by remote operation from a terminal device 2, a first request or the like. The request to the destination included in a first response or the second request is information for instructing each monitored device's (3) control in the destination of the first response, information for instructing monitoring of each monitored device (3), or the like.

The schedule setting function 103. is configured to set each schedule (time schedule) of the terminal devices 2. For example, each schedule of the terminal devices 2 is set so that each of the terminal devices 2 can communicate with the center 1 at constant intervals (communication time intervals). In the embodiment, the function 103 is configured: to evaluate the number of the terminal devices 2 based on communication with each of the terminal devices 2; to determine each schedule of the terminal devices 2 in response to the processing ability of the controller 10 and the number of the terminal devices; and to transmit a corresponding schedule to each of the terminal devices 2 through the communication device 11.

As shown in FIGS. 1B and 2, each terminal device 2 includes a communication device 21 (a first communication device), a communication device 22 (a second communication device), a storage device 23 and a controller 20, and is connected to the communication lines 6 and 7 through the communication devices 21 and 22, respectively. Each terminal device 2 also includes a timer (not shown).

The communication device 21 is, for example, a network interface compliant to IEEE 802.3 or the like. That is, each of the communication device 11 of the center device 1 and the communication devices 21 of the communication devices 2 provides communication between the center device 1 and each of the terminal devices 2 as well as between the terminal devices 2 in the same group. The communication device 22 is configured to communicate with at least one monitored device 3. For example, the communication device 22 is a communication device for a time division multiple access transmission system which includes a primary station (a terminal device 2) and (a) secondary stations (monitored devices 3). This communication device is well known to those skilled in the art and is not described in detail herein. The storage device 23 is, for example, a semiconductor memory device, a hard disk drive or the like, and stores identification data (e.g., local identification data such as a local IP address, a MAC address or the like) of each of other terminal devices 2 under the same router 4.

The controller 20 is formed of one or more CPUs, programs and so on, and has a terminal request function 201, a terminal transfer function 203, a terminal response function 202 and an updating function 204.

In FIG. 1B, the terminal request function 201 is configured to transmit a first request to the center device 1 through the communication device 21. In the embodiment, the function 201 is configured to transmit a first request to the center device 1 through the communication device 21 in accordance with the schedule set based on the terminal devices 2. Thereby, the center device 1 is to return a first response, or at least one combination of second request and a first response including identification data.

The terminal transfer function 203 is configured, if the first response corresponding to the first request includes at least one second request and at least one terminal device's (2) identification data, to transfer the at least one second request to the terminal device 2 specified by the at least one terminal device's (2) identification data through the communication device 21 (see FIG. 3).

The controller 20 is also configured to control each monitored device 3 through the communication device 22 of its own terminal device 2 in accordance with a first response from the center device 1 or a second request from another terminal device 2.

The terminal response function 202 is configured to return a response (a second response) showing completion of the control to the center device 1 through the communication device 21 after controlling each monitored device 3 in accordance with a second request from another terminal device 2.

The updating function 204 is configured to update its own schedule to the schedule from the center device 1. The updating includes initial setting.

First, an initial operation of the embodiment is explained. For example, after four terminal devices 2 are connected under a router 4, the terminal devices 2 are initially activated and then sequentially transmit a first request to the center device 1 each during a default time (e.g., one minute). The sequential operations are repeated until completion of initial setting.

Thereby, the controller 10 of the center device 1 (the schedule setting function 103) can obtain the number of the terminal devices 2 after the default time. The controller 10 subsequently adds the number of the terminal devices 2 to the number of terminal devices under other routers 4 and thereby calculates the total number of the terminal devices 2 under the whole routers 4 and stores the total number in the storage device 13. The center device 1 then determines each schedule (time schedule) of the terminal devices 2 in response to the processing ability of the controller 10 and the total number. Specifically, the controller 10 takes account of increase and decrease of its own processing load corresponding to the total number, and determines a constant (time) interval by which the whole terminal devices 2 can communicate with the center device 1 within the range of its own processing ability each and each terminal device 2 can sequentially communicate with the center device 1. The controller 10 then determines each schedule of all the terminal devices 2 base on the constant interval.

Subsequently, whenever the center device 1 receives a first request from each terminal device 2 under the whole routers 4, the controller 10 (schedule setting function 103) returns the schedule for the terminal device 2 together with the present time measured with the center device 1 through the communication device 11. Thereby, each of the four terminal devices 2 initially sets the schedule from the center device 1 as its own schedule and sequentially completes its own initial setting, while each terminal device 2 under the aforementioned other routers 4 updates its own schedule to the schedule from the center device 1. Each terminal device 2 under the whole routers 4 also synchronizes its own time clock with the present time from the center device 1.

In a simple example, if the aforementioned total number is 4 and the center device 1 can execute a reception processing at about 1-second intervals, the center device 1 determines 15 seconds (=60/4) as the constant interval based on about 1-minute cycle (go-around time) and the total number. The center device 1 then determines each schedule of the four terminal devices 2 so that the four terminal devices 2 can transmit first requests to the center device 1 at the timing of 0-second, 15-second, 30-second and 45-second per minute. Thus, the constant interval is used and thereby first requests from the terminal devices 2 can be used as keep-alive packets of the terminal devices 2, respectively.

Next, an operation of the four terminal devices 2 in the local area after the initial operation is explained. Each of the four terminal devices 2 collects an identification data set for communicating with each other (IP addresses and a local identification data set), and stores the collected identification data set in its own storage device 23 (identification data storage device). The operation can be performed so that the terminal devices 2 mutually transmit and receive keep-alive packets.

If identification data of each of the terminal devices 2 is an address for a wide area network such as a global IP address (address information) or the like, the memory capacity (area) of the storage device 13 in the center device 1, which is occupied by identification data of each of them, is increased. However, the center device 1 can unify management of identification data of each of the terminal devices 2 and also can respond to each terminal device 2 directly.

If identification data of each of the terminal devices 2 is local identification data only used under a router 4, each terminal device 2 needs to store identification data of each of other terminal devices 2 in its own storage device 23. However, the number of identification data is few, and accordingly identification data of each of them simply occupies small capacity (area) of a storage device 23. In addition, local identification data is a low bit number in comparison with the address for a wide area network, and accordingly can reduce traffic.

Figure 4:
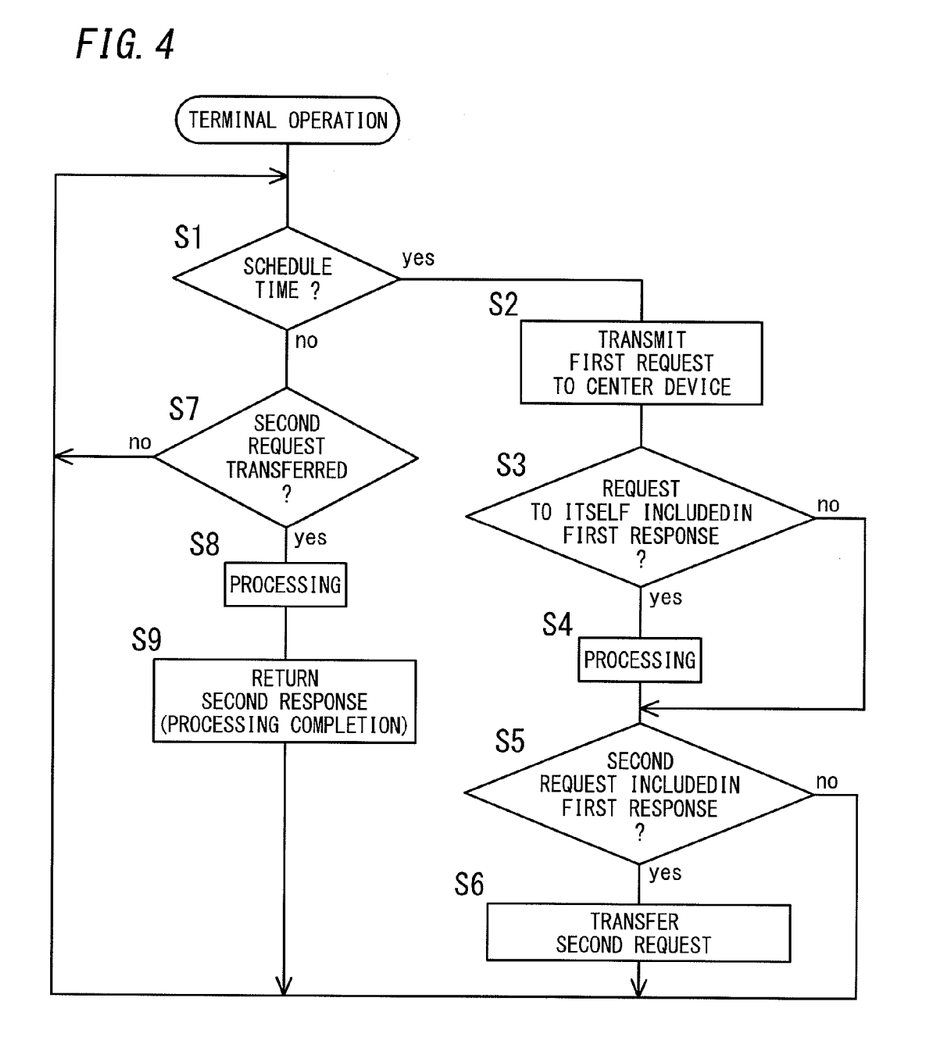
FIG. 4 is an operational flow chart of each terminal device in the monitoring system.

Finally, stationary behavior between the center device 1 and each terminal device 2 is explained with reference to FIGS. 3 and 4. A terminal device 2a checks whether or not the present time is its own schedule time (S1). If the present time is the schedule time (S1: yes), the terminal device 2a transmits a first request (e.g., an empty request) to the center device 1 (S2). Since the first request is transmitted from the terminal device 2a to the center device 1, the first request can be transmitted to the center device 1 through a router 4.

In the center device 1, if receiving the first request from the terminal device 2a, the center device 1 checks whether to have a request to the terminal device 2a or not. If having a request to the terminal device 2a, the center device 1 includes the request to the terminal device 2a in a first response. In addition, the center device 1 checks whether or not to have at least one second request to be transmitted to at least one of other terminal devices 2b-2d under the same router 4 as that of the destination of the first response. If not having any second request, the center device 1 returns the first response to the terminal device 2a. In this instance, if the first response does not include a request to the terminal device 2a and any second request, an empty response is returned. On the other hand, if having the at least one second request, the center device 1 includes, in the first response, the at least one second request and the at least one terminal device's (2) identification data. The center device 1 subsequently returns the first response including the at least one second request or the like.

In the terminal device 2a, if receiving the first response, the terminal device 2a checks whether or not the first response includes the request to the terminal device 2a (request information) (S3). If the first request includes the request to the terminal device 2a (S3: yes), the terminal device 2a executes the processing corresponding to the request (S4). For example, if the request is information for instructing monitoring of each monitored device 3 of the terminal device 2a, the terminal device 2a returns monitoring result (content) of each of the monitored devices 3. The terminal device 2a subsequently checks whether or not the first response includes at least one second request (request information) (S5). If at lest one second request is included in the first response (S5: yes), the terminal device 2a transfers the at least one second request to at least one terminal device 2 specified by the at least one terminal device's (2) identification data (S6). In the example of FIG. 3, the first response includes the terminal device's (2c) identification data and a second request to the terminal device 2c, and accordingly the second request to the terminal device 2c is transferred to the terminal device 2c through the terminal device 2a.

The terminal device 2c also checks whether or not the present time is its own schedule time, like the terminal device 2a (S1). If the present time is not the schedule time (S1: no), the terminal device 2c checks whether or not a second request is transferred from other terminal device 2 (S7). If the second request is transferred (S7: yes), the terminal device 2c executes the processing corresponding to the second request (S8). The terminal device 2c subsequently returns a response (a second response) representing the processing completion of the second request to the center device 1. For example, if the second request is information for instructing monitoring of each monitored device 3 of the terminal device 2c, the terminal device 2c returns a response representing the processing completion of the second request and monitoring result (content) of each of the terminal devices 3.

Therefore, in the embodiment, it is possible to shorten transmission (return) delay of information to be transmitted from the center device 1 to a specific terminal device 2 without increase of the processing ability of the center device 1 and a communication speed.

Figure 5:
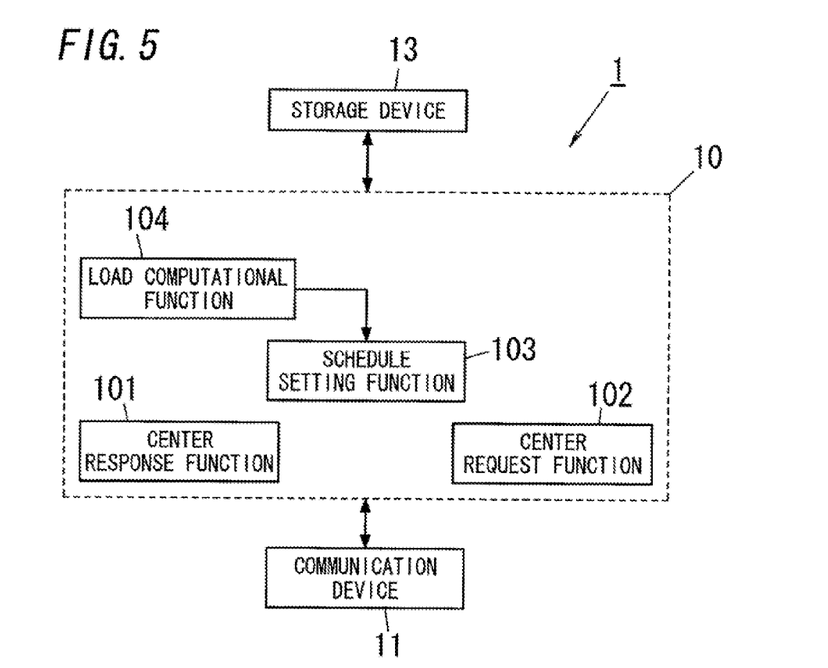
FIG. 5 is a block diagram of a monitoring system in an embodiment.

In an embodiment, as shown in FIG. 5, the controller 10 further has a load computational function 104. The function 104 is configured to estimate or calculate the processing load of the controller 10. For example, the function 104 measures the load of the controller 10 and estimates the processing load from the measured load. In the center device 1 capable of executing a reception processing at about one-second intervals, if the processing load of the center device 1 is increased, the reception processing may not be executed at the intervals. Accordingly, the schedule setting function 103 is configured, if obtaining a larger processing load from the function 104, to determine each schedule of the terminal devices 2 so that each of the terminal devices 2 can communicate with the center device 1 at longer intervals.

Figure 6:
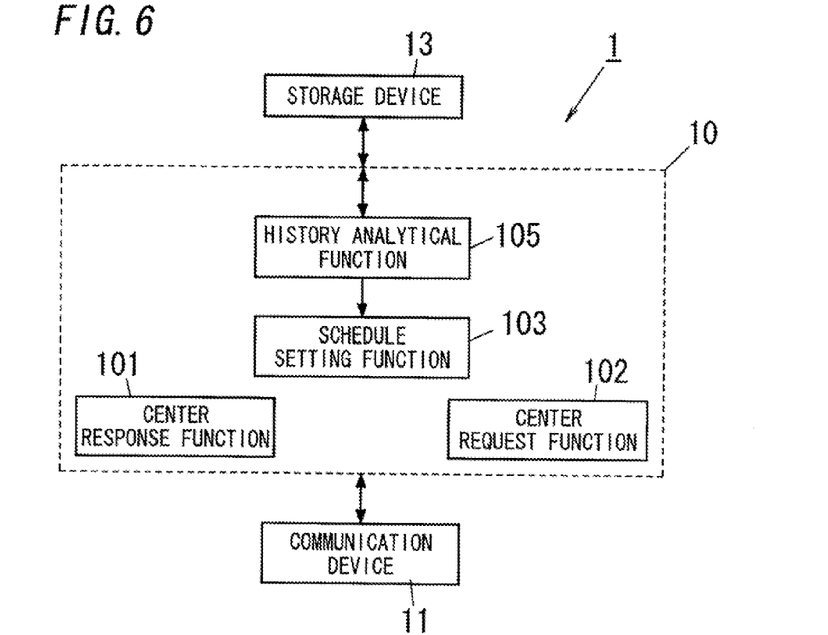
FIG. 6 is a block diagram of a monitoring system in an embodiment.

In an embodiment, as shown in FIG. 6, the controller 10 further has a history analytical function 105. The storage device 13 is also used as a history storage device. The history storage device stores, by terminal device 2, first responses to the terminal devices 2 (except empty responses) and the transmission history of second requests through the controller 10. The function 105 is configured to calculate a transmission rate (or an occurrence frequency of the information to be transmitted) per unit time by terminal device 2 based on the history stored in the history storage device. The transmission rate is, for example, a moving average value or the like. The schedule setting function 103 is configured, based on each transmission rate from the function 105, to determine each schedule of the terminal devices 2 so that each terminal device 2 can communicate with the center device 1 at shorter intervals as having a higher transmission rate.

In an example, the history analytical function 105 may divide one day into a plurality of time periods such as before noon, afternoon (daytime), nighttime and so on to calculate a transmission rate per unit time of each terminal device 2 by time period. In this example, each schedule can be determined so that: in before noon, the communication time interval of a terminal device 2a is more shortened than that of each of other terminal devices 2b-2d; in daytime, the communication time interval of a terminal device 2b is more shortened than that of each of other terminal devices 2a, 2c and 2d; and in nighttime, each communication time interval of terminal devices 2c and 2d is more shortened than that of each of other terminal devices 2a and 2b. Similarly, the function 105 may calculate a transmission rate per unit time of each terminal device 2 by day of the week or season.

Figure 7:
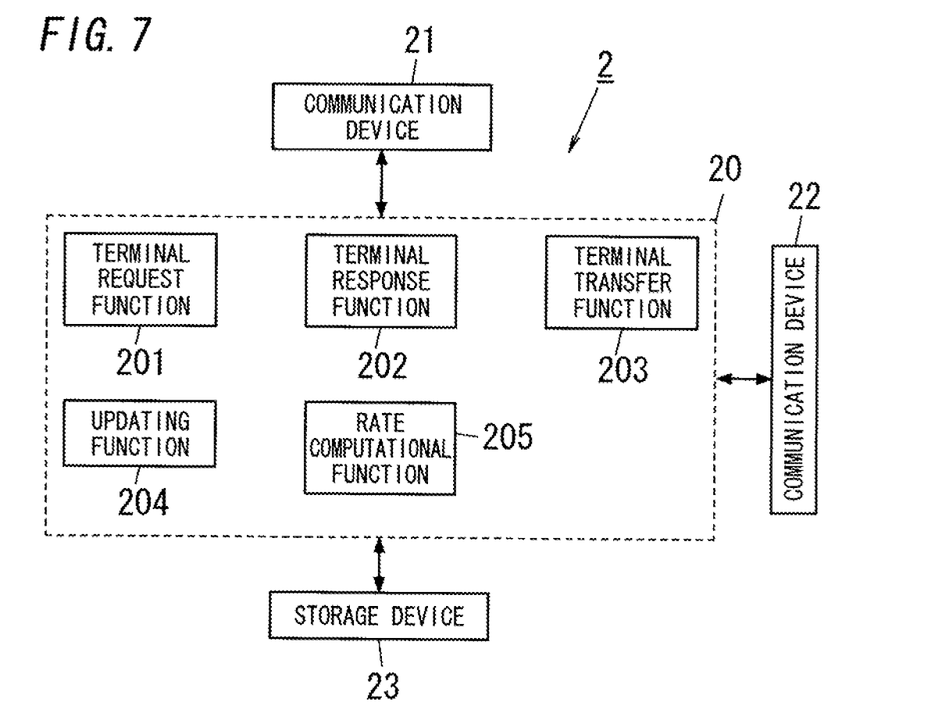
FIG. 7 is a block diagram of a terminal device in an embodiment.

In an embodiment, as shown in FIG. 7, each controller 20 of the terminal devices 2 further has a rate computational function 205. The function 205 is configured to estimate or calculate a communication rate with the center device 1 caused by at least one monitored device 1 connected to its own terminal device 2. For example, the function 205 is configured calculate or estimate a transmission rate of, first responses to be transmitted from the center device 1 (except empty responses) and second requests (or an occurrence frequency of the information to be transmitted), based on the number of the monitored devices 3 connected to its own terminal device 2. The terminal request function 201 and the terminal response function 202 transmit the communication rate to the center device 1. The schedule setting function 103 is configured, based on each communication rate from the terminal devices 2, to determine each schedule of the terminal devices 2 so that each terminal device 2 can communicate with the center device 1 at shorter intervals as having a higher transmission rate.

In an example, the communication time interval (e.g., 5 seconds) of the terminal device (e.g., 2a) having the highest transmission rate is more shortened than that (e.g., 20 seconds) of each of other terminal devices (e.g., 2b-2d).

In an embodiment, each controller 20 of the terminal devices 2 further has a time interval computational function. This function is configured: to decide which numerical range of predetermined numerical ranges corresponds to the number of the monitored devices 3 connected to its own terminal device 2; and to calculate or determine communication time interval with the center device 1 base on the decided numerical range. For example, if the number of the monitored devices 3 corresponds to 0-5, 6-10 or 11-20, the time interval is determined as 20 seconds, 15 seconds or 5 seconds, respectively. The terminal request function 201 or the terminal response function 202 transmits the determined time interval to the center device 1.

Thus, each schedule of the terminal devices 2 is set based on a rate or the like, and thereby the occurrence frequency of second requests can be reduced, and the transfer rate of second requests and corresponding processing load can be reduced. Accordingly, since each terminal device 2 can exclusively execute the processing corresponding to first responses to itself, response can be enhanced.

In an example, each controller 20 of the terminal devices 2 may obtain a processing load from its own CPU's operation to transmit the processing load to the center device 1. The center device 1 may determine each communication time interval of the terminal devices 2 based on each processing load of the terminal devices 2.

Although the present invention has been described with reference to certain preferred embodiments, numerous modifications and variations can be made by those skilled in the art without departing from the true spirit and scope of this invention.

The invention claimed is:

1. A monitoring system, comprising a center device and a plurality of terminal devices,
   wherein the center device comprises:
   a center response function configured to return a first response including prescribed information in response to a first request, based on a time schedule, from a terminal device, and thereby to transmit the prescribed information to the terminal device; and
   a center request function configured, if having at least one second request to be transmitted to at least one of other terminal devices when receiving said first request from the terminal device, to include the at least one second request in the first response to the terminal device,
   wherein each of the terminal devices comprises a terminal transfer function configured, if the first response corresponding to the first request includes the at least one second request, to transfer the at least one second request to said at least one of other terminal devices.

2. The monitoring system of claim 1,
   wherein the center device and the terminal devices each comprise their own first communication devices,
   wherein each of the first communication devices is configured to provide communication between the center device and each of the terminal devices as well as between the terminal devices,
   wherein the center response function is configured, if receiving a first request from any one of the terminal devices through the first communication device of the center device, to return a first response through the first communication device, wherein the center request function is configured, if having at least one second request to be transmitted to at least of other terminal devices before the center response function returns the first response, to include the at least one second request and identification data of the at least one terminal device in the first response, wherein each of the terminal devices comprises a controller that comprises a terminal request function and said terminal transfer function, said terminal request function being configured to transmit a first request to the center device through the first communication device of its own terminal device, said terminal transfer function being configured, if the first response corresponding to the first request includes at least one second request and identification data of at least one terminal device, to transfer the at least one second request to the terminal device specified by the identification data of at least one terminal device through said first communication device.

3. The monitoring system of claim 2,
wherein each of the terminal devices further comprises a second communication device configured to communicate with at least one monitored device,
wherein each controller of the terminal devices is configured, in accordance with a first response from the center device or a second request from another terminal device, to execute processing corresponding to the first response or the second request,
wherein each of the terminal request functions is configured to transmit a first request to the center device through the first communication device of its own terminal device in accordance with the schedule set based on the terminal devices.

4. The monitoring system of claim 1,
wherein the terminal devices are divided into a plurality of groups configured to communicate with the center device through a plurality of routers, respectively,
wherein the center request function is configured, if the center device has at least one second request to be transmitted to at least one of other terminal devices under the same router as the destination of said first response before returning the first response, include the at least one second request and identification data of the at least one terminal device in the first response.

5. The monitoring system of claim 4,
wherein identification data of each of the terminal devices is local identification data,
wherein each of the terminal devices further comprises a storage device for storing local identification data of each of other terminal devices under the same router as its own one.

6. The monitoring system of claim 4, wherein identification data of each of the terminal devices is address information.

7. The monitoring system of claim 3, wherein each controller of the terminal devices further comprises a terminal response function configured:
in accordance with a second request from another terminal device, to execute the processing corresponding to the second request; and subsequently
to return a response representing completion of the processing to the center device through the first communication device of its own terminal device.

8. The monitoring system of claim 3, wherein each schedule of the terminal devices is set so that each of the terminal devices can communicate with the center device at constant intervals.

9. The monitoring system of claim 3, wherein each schedule of the terminal devices is set so that a terminal device can communicate with the center device at shorter intervals as the terminal device has a higher communication ratio with the center device.

10. The monitoring system of claim 9,
wherein the center device further comprises a history storage device for storing a transmission history of first responses to the terminal devices and second requests by terminal device,
wherein said communication ratio is a transmission ratio of first responses from the center device to each of the terminal devices and second requests, said communication ratio being obtained from the transmission history.

11. The monitoring system of claim 3,
wherein the controller of the center device further comprises a schedule setting function configured:
(i) to evaluate the number of the terminal devices based on communication with each of the terminal devices;
(ii) to determine each schedule of the terminal devices in response to the processing ability of the controller and the number of the terminal devices; and
(iii) to transmit a corresponding schedule to each of the terminal devices through the first communication device,
wherein each controller of the terminal devices further comprises an updating function for updating its own schedule to the schedule from the center device.

12. The monitoring system of claim 11,
wherein the controller of the center device further comprises a load computational function configured to estimate or calculate processing load of the controller,
wherein the schedule setting function is configured, if obtaining a larger processing load from the load computational function, to determine each schedule of the terminal devices so that each of the terminal devices can communicate with the center device at longer intervals.

13. The monitoring system of claim 11,
wherein each controller of the terminal devices further comprises a rate computational function configured to estimate or calculate a communication ratio with the center device caused by at least one monitored device connected to its own terminal device,
wherein the schedule setting function is configured, based on each communication rate obtained from the rate computational functions of the terminal devices, to determine each schedule of the terminal devices so that a terminal device can communicate with the center device at shorter intervals as the terminal device has a higher communication rate.

14. A terminal device in a monitoring system comprising a center device and a plurality of terminal devices, the center device comprising:
a center response function configured to return a first response including prescribed information in response to a first request, based on a time schedule, from a terminal device, and thereby to transmit the prescribed information to a terminal device, and
a center request function configured, if having at least one second request to be transmitted to at least one of other terminal devices when receiving said first request from the terminal device, to include the at least one second request in the first response to the terminal device, wherein the terminal device comprises:
a terminal request function configured to transmit the first request to the center device in accordance with the time schedule; and
a terminal transfer function configured, if the first response received from the center device in response to the first request includes the at least one second request to be transmitted to at least one of the other terminal devices, to transfer the at least one second request to the at least one of the other terminal devices.

\* \* \* \* \*